C. C. FARMER.
TRIPLE VALVE TESTING APPARATUS.
APPLICATION FILED FEB. 4, 1909.
1,143,620.
Patented June 22, 1915.
4 SHEETS—SHEET 3.
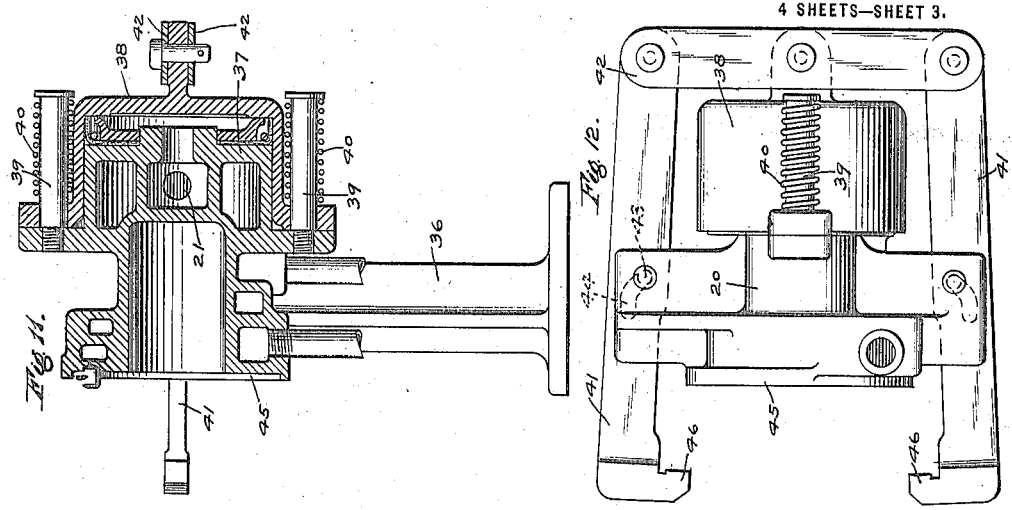
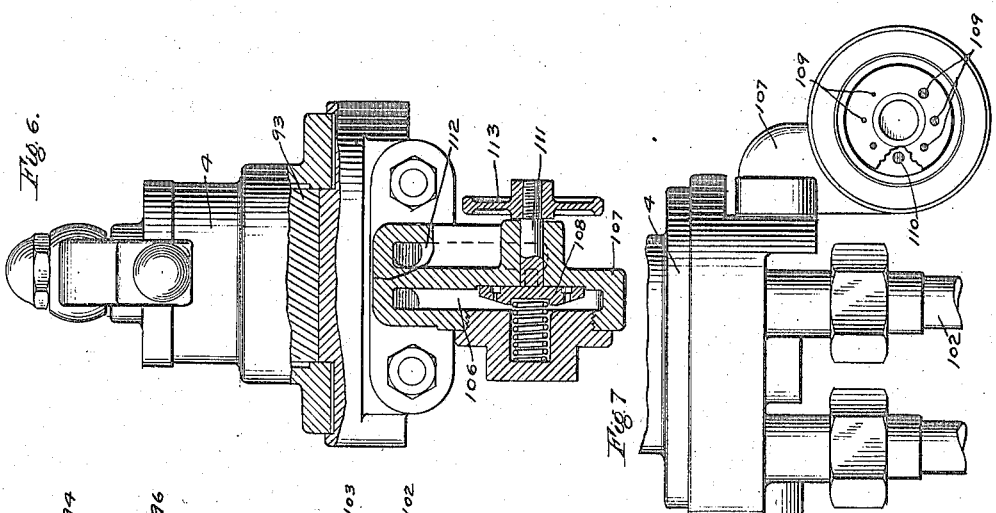
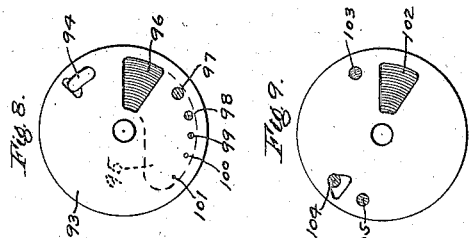
WITNESSES
Wm. M. Cady
G. A. Custer
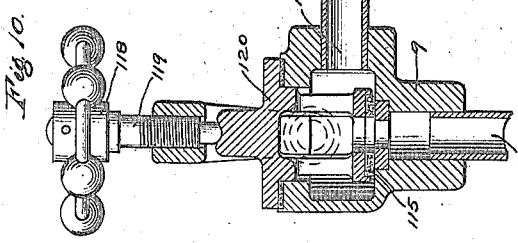
INVENTOR
Clyde C. Farmer
by E. Wright
Att'y.

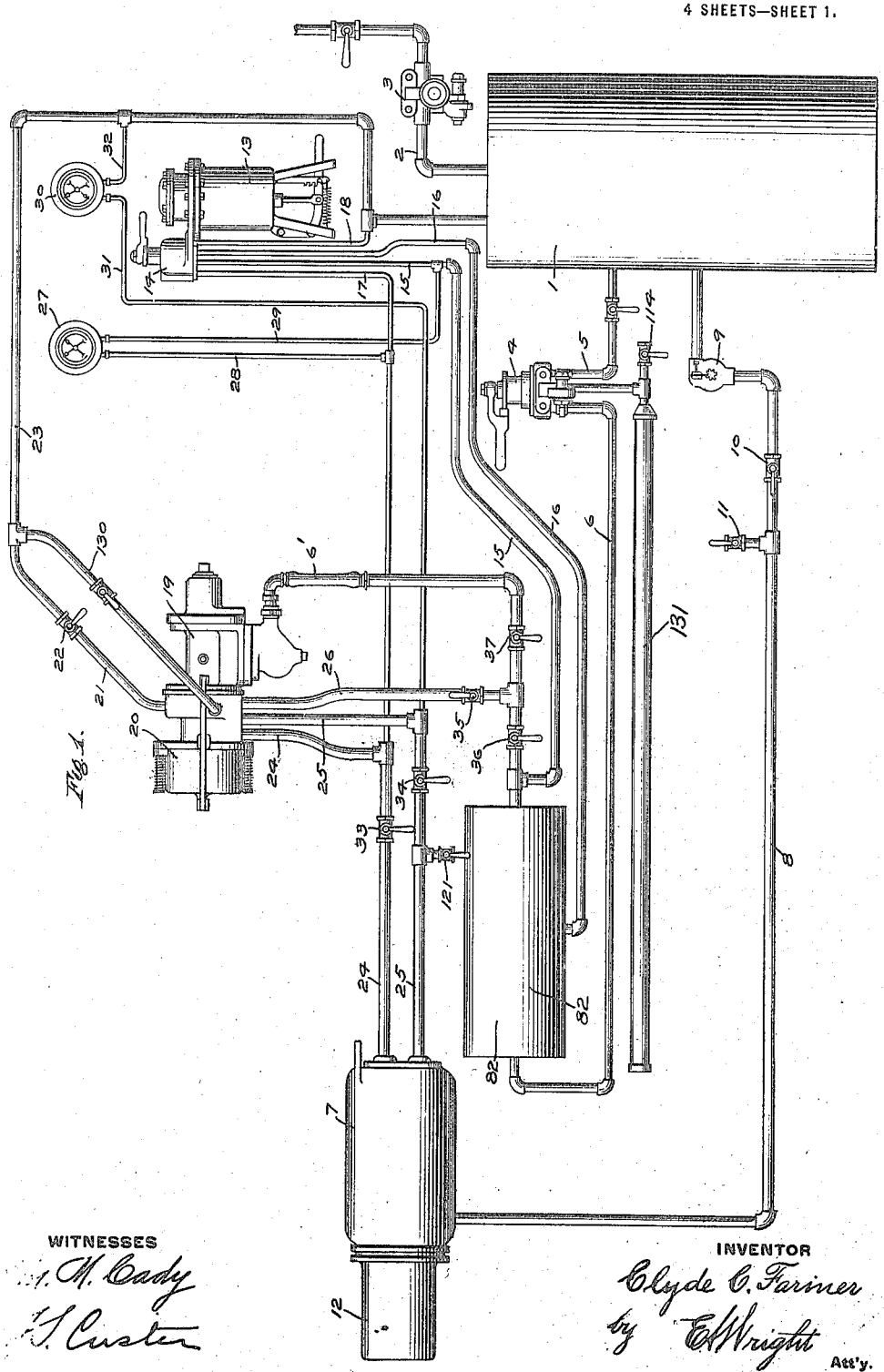

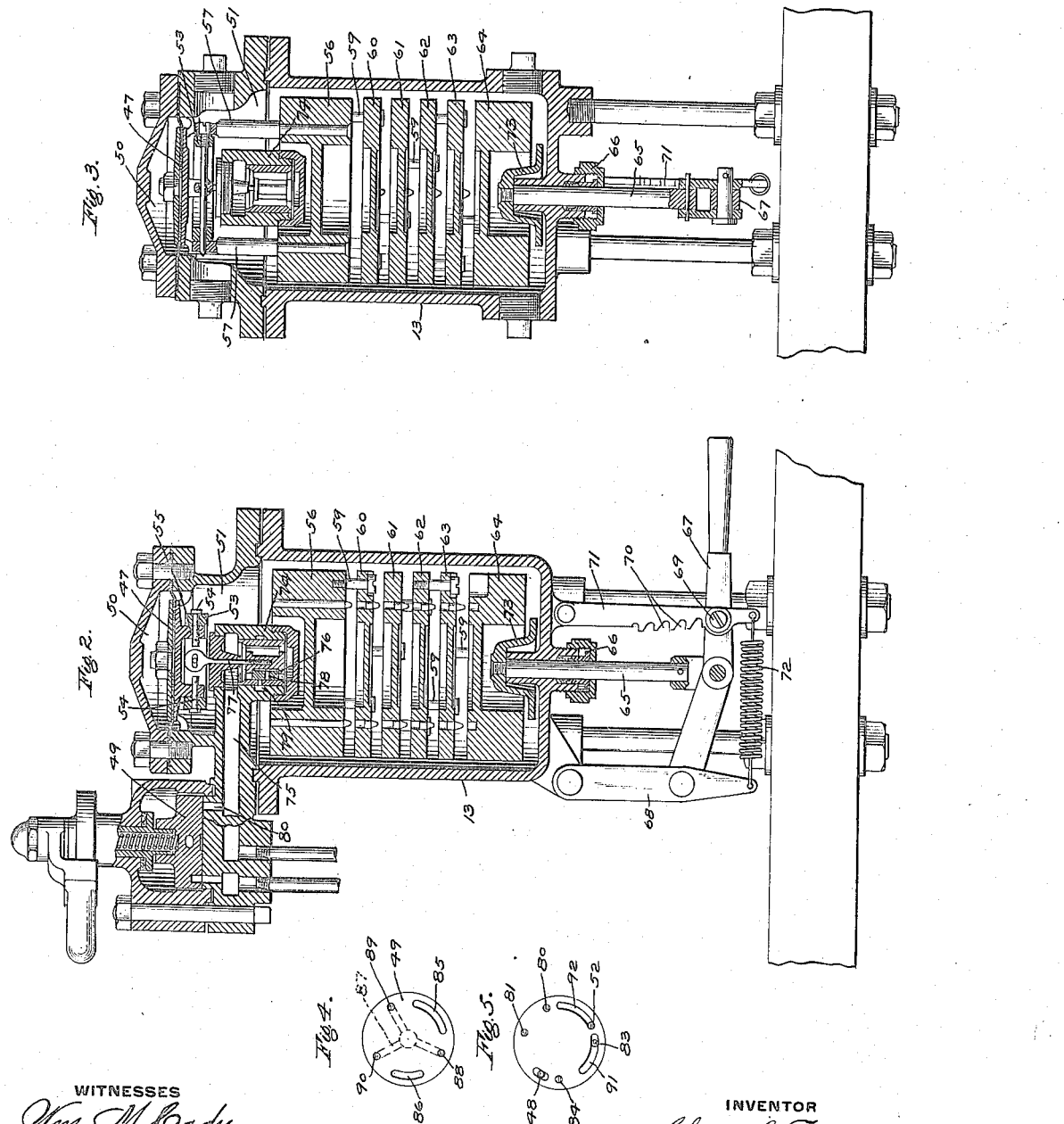

C. C. FARMER.
TRIPLE VALVE TESTING APPARATUS.
APPLICATION FILED FEB. 4, 1909.
1,143,620.
Patented June 22, 1915.
4 SHEETS—SHEET 4.
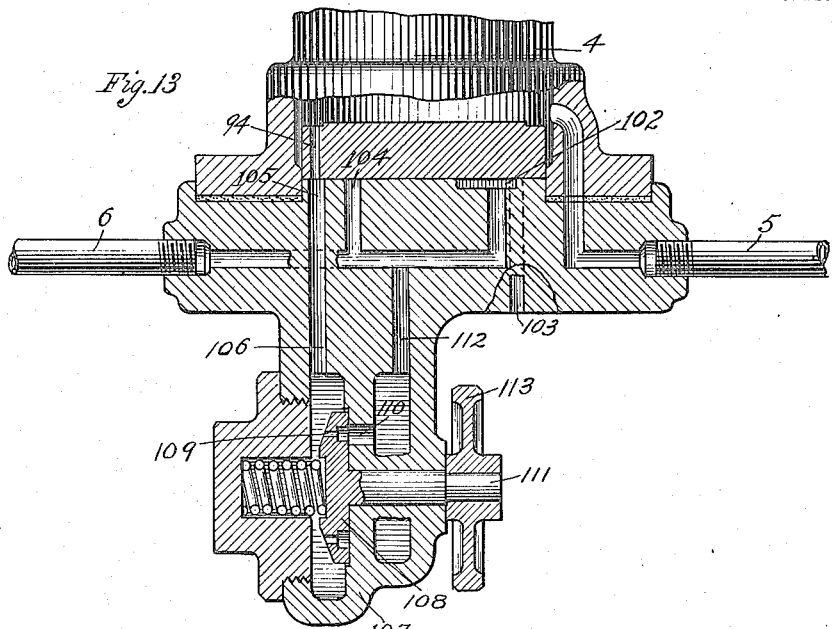
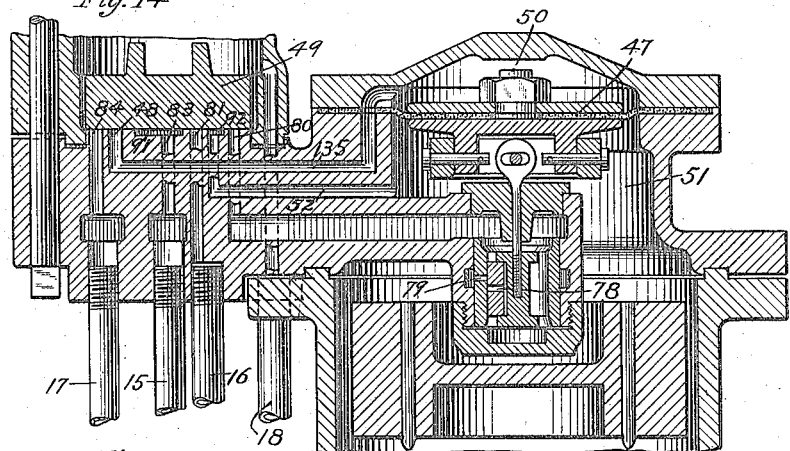
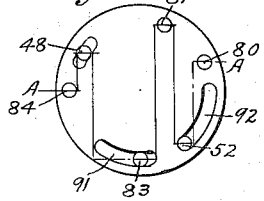
WITNESSES
Wm. M. Cady
R. C. Swartzwelder
INVENTOR
Clyde C. Farmer
by E. Wright
Att'y.

UNITED STATES PATENT OFFICE.

CLYDE C. FARMER, OF CHICAGO, ILLINOIS, ASSIGNOR TO THE WESTINGHOUSE AIR BRAKE COMPANY, OF PITTSBURGH, PENNSYLVANIA, A CORPORATION OF PENNSYLVANIA.

TRIPLE-VALVE-TESTING APPARATUS.

1,143,620.  Specification of Letters Patent.  Patented June 22, 1915.

Application filed February 4, 1909. Serial No. 475,972.

*To all whom it may concern:*

Be it known that I, CLYDE C. FARMER, a citizen of the United States, residing at Chicago, in the county of Cook and State of Illinois, have invented new and useful Improvements in Triple-Valve-Testing Apparatus, of which the following is a specification.

This invention relates more particularly to an apparatus for testing triple valves and the like. Among other things, these tests determine the responsiveness of the triple valve parts to movement when a differential of pressures is produced on the triple valve piston at a desired minimum degree, the effect of friction of the moving parts, whether the ports are capable of permitting a desired rate of flow through them, the extent of piston leakage and whether leakage exists at various other points. In making tests of this character, it is desirable to obtain and maintain predetermined differentials in pressure between the auxiliary reservoir and brake pipe, as nearly constant as possible, and it is one of the objects of my improvements to provide means for maintaining a constant difference in pressures between two receptacles containing fluid under pressure.

Another object is to provide a pneumatically operated mechanism for clamping the triple valve or other device in position for testing.

Still another object of my invention consists in generally improving the construction and operation of testing apparatus of the above nature.

In the accompanying drawings Figure 1 is a diagrammatic view of a triple valve test rack equipment embodying my improvements; Fig. 2 a vertical section of the device for maintaining a constant differential of pressures between two receptacles containing fluid under pressure; Fig. 3 a vertical section on a plane at right angles to that of Fig. 2; Fig. 4 a face view of the rotary valve employed in connection with the differential pressure maintaining device; Fig. 5 a plan view of the valve seat for the above valve, showing the location of ports therein; Fig. 6 an elevation, partly in section, of the brake valve employed in connection with the test rack for controlling the brake pipe pressure; Fig. 7 an elevational view of the above brake valve taken on a plane at right angles to that of Fig. 6 and with the cap of the brake pipe feed device removed, to show the arrangement of feed ports therein; Fig. 8 a face view of the rotary valve employed in the above brake valve showing the relative location of its ports and cavities; Fig. 9 a plan view of the valve seat for the above rotary valve; Fig. 10 a vertical section of the valve device for regulating the feed of air to the auxiliary reservoir; Fig. 11 a vertical section of the device for clamping and maintaining the triple valve in position for testing; Fig. 12 a top plan view of said clamping device; Fig. 13 a distorted section of the brake valve shown in Fig. 6, illustrating the relative positions of the ports in the valve seat; Fig. 14 a distorted section of the upper portion of the construction shown in Fig. 2, with the brake valve seat sectioned on line A—A of Fig. 15; and Fig. 15 a plan view of the valve seat for the rotary valve shown in Fig. 14 indicating the line on which the section of the above valve seat is taken.

According to Fig. 1 of the drawings, the triple valve testing apparatus comprises a main supply reservoir 1 provided with a supply pipe 2 containing a feed valve device 3 and connected to a suitable source of fluid pressure so that a predetermined degree of pressure may be maintained in the reservoir.

Brake valve 4 is connected by a pipe 5 to the reservoir 1 and controls the admission of fluid reservoir to and its release from the brake pipe 6. An auxiliary reservoir 7 is connected to the supply reservoir 1 by a pipe 8 containing a feed control valve 9, a cut out cock 10, and an atmospheric vent cock 11, a reservoir 12 of a capacity to correspond with a brake cylinder in actual service being attached to the auxiliary reservoir 7 in the same manner as a brake cylinder. Valve mechanism 13 for maintaining a constant differential of pressures between the brake pipe and auxiliary reservoir is provided with a manual controlling valve 14 having ports leading to pipes 15 and 16 opening into the brake pipe and ports opening into pipes 17 and 18, leading respectively to the auxiliary reservoir 7 and the supply reservoir 1.

Triple valve device 19, to be tested, is secured in position for testing by means of a clamping device 20, the operation of which is controlled by fluid under pressure supplied thereto through a pipe 21 provided with a cock 22 and connected to pipe 23, opening into the supply reservoir 1. This clamping device is provided with port connections leading to auxiliary reservoir pipe 24, brake cylinder pipe 25, and brake pipe branch 26, the latter connection being employed where the triple valve to be tested is of the "pipeless" type.

Pressure gage 27 is connected to pipes 28 and 29 leading respectively to the auxiliary reservoir pipe 24 and brake pipe branch 15 to indicate auxiliary reservoir and brake pipe pressures, and gage 30 is connected to pipes 31 and 32 leading respectively to brake cylinder pipe 25 and supply reservoir pipe 23 to indicate brake cylinder and supply reservoir pressures.

Auxiliary reservoir pipe 24, brake cylinder pipe 25 and branch brake pipe 26 are provided respectively with cut out cocks 33, 34, and 35, and brake pipe 6' on opposite sides of the branch pipe 26 is provided with cocks 36 and 37.

As shown in Figs. 11 and 12, the triple valve holding stand 20 comprises a standard 36 carrying a stationary piston 37 contained in a movable cylinder 38. The cylinder 38 is mounted to reciprocate on guide pins 39 having coil springs 40 tending to shift the cylinder in one direction, the movement of the cylinder in the opposite direction being effected by admitting fluid under pressure through pipe 21 to the space between the piston 37 and the outer head of the cylinder 38.

Triple valve gripping levers 41 are pivotally connected to the opposite ends of links 42, in turn pivoted to the cylinder 38, the levers being provided with bayonet shaped slots 44 within which stationary pins 43 project.

The face 45 of the stand 20 is provided with port openings leading to the auxiliary reservoir, brake cylinder, and train pipe, in position to register with corresponding ports in the triple valve gasket face.

In operation, the triple valve to be tested is applied with its gasket face against the face 45 and cock 22 is opened to admit fluid under pressure to the cylinder 38. Thereupon the cylinder is moved outwardly and the levers 41 are drawn inwardly so that the jaws 46 engage the gasket flange of the triple valve device, and as the levers move inwardly, a lateral closing movement is also produced by reason of the cam action of pins 43 in the slots 44. Thus in the open position the jaws are spread apart to permit the triple valve to be readily positioned, while in the closed position the jaws move inwardly and laterally and finally engage and firmly grip the triple valve flange so as to hold the triple valve securely in position.

The differential pressure mechanism 13 comprises a diaphragm 47, the chamber 50 above which is connected by a passage 135 in the casing with port 48 in the valve seat of the rotary valve 49, and the chamber 51 below which is connected to port 52 as shown in Fig. 14. A series of weights are suspended from the under side of the diaphragm by means of a ring 53 adapted to swing on trunnions 54 mounted on lugs 55 secured to the diaphragm, the principal weight 56 being provided with suspension rods 57 pivotally connected to the ring 53 in a plane at right angles to the axial plane of the trunnions 54. By employing this form of suspension the weights are practically freely suspended and therefore exert a constant and uniform downward pressure on the diaphragm. Headed bolts 59 are screwed into the under face of the weight 56 and a smaller weight 60 is loosely mounted to move freely on the bolts 59 and similarly a weight 61 is suspended from weight 60 and likewise any number of weights, such as weights 62, 63, and 64, may be successively suspended.

Extending upwardly through the bottom of the casing of the differential valve mechanism is a rod 65, adapted to vertically reciprocate in a stuffing box 66. This rod is pivotally connected to a hand lever 67 having one end pivoted to a swinging link 68 and provided with a projecting pin 69 for engagement with notches 70 formed in a swinging ratchet bar 71, a coil spring 72 connecting the lower ends of the link 68 and ratchet bar 71 for yieldingly pressing ratchet bar 71 against the pin 69. The upper end of the rod 65 is provided with a flanged cap 73 adapted to engage the under face of the weight 64 upon upward movement of the rod 65. When the pin 69 is in the lowest of the notches 70, the cap 73 is out of contact with weight 64 and all the weights are permitted to act on and oppose the upward movement of the diaphragm 47. The movement of lever 67 so that pin 69 engages the next notch above elevates the cap 73 sufficiently to engage and lift the lowermost weight from its normal support on the heads of the suspension bolts 59. The diaphragm is then subject only to the action of weights 63, 62, 61, 60, and 56. In a like manner by adjusting the lever 67 to the succeeding notch, the next weight 63 may be lifted, and so on. Thus the load on the diaphragm may be varied at will to correspond with a given differential of pressures which it is desired to maintain.

A valve casing 74 extends into the chamber 51 and is provided with a vent chamber 75 containing a slide valve 76. This valve is pivotally attached by a rod 77 to diaphragm 47, the rod extending through an aperture in the valve casing 74. The valve 76 is provided with a through port 78 adapted in one position of the valve to register with an atmospheric exhaust port 79. Vent chamber 75 is open to a port 80 leading to the rotary valve seat. The rotary valve seat is further provided with a port 81 leading to pipe 16, which is connected with a brake pipe volume reservoir 82, port 83 leading to pipe 15 and the brake pipe proper, and port 84 leading to the auxiliary reservoir pipe 17.

The rotary valve 49 is provided with cavities 85, 86, and 87, the latter cavity having three port openings 88, 89, and 90 in the face of the valve.

The rotary valve 49 has four positions, in the first of which, port opening 90 of cavity 87 registers with cavity 91 leading to brake pipe port 83 and port opening 89 registers with cavity 92 leading to port 52 which opens into chamber 51 at the under face of diaphragm 47, cavity 86 connects port 84 leading to the auxiliary reservoir pipe with port 48 opening to the chamber 50 at the upper face of the diaphragm, and cavity 85 connects port 81 leading to the brake pipe reservoir pipe 16 with port 80 opening into the vent chamber 75. In position two, port openings 88, 89, and 90 register respectively with ports 48, 83, and 52, so that diaphragm chamber 50 is connected with chamber 51 and also with the brake pipe. Cavity 86 also connects auxiliary reservoir port 84 with brake pipe port 83. In position three, port openings 88, 89, and 90 still communicate with ports 48, 83, and 52. In position four, port opening 88 registers with port 84, port opening 89 with port 80, and port opening 90 with port 52, so that diaphragm chamber 51 is connected with the auxiliary reservoir and vent chamber 75. Cavity 85 connects port 81 with port 48, so that the top of the diaphragm 47 is connected with the brake pipe reservoir.

The brake valve 4 for controlling the brake pipe pressure comprises a rotary valve 93 having a through port 94 and a cavity 95 having a large port opening 96 and a series of port openings 97, 98, 99, 100, and 101 of varying sizes. The valve seat for the rotary valve is provided with a port 102 leading to the brake pipe 6, port 103 leading to the atmosphere, port 104, also opening into the brake pipe, and port 105 leading to passage 106 of a feed regulating device 107. This feed regulating device comprises a rotatable disk 108 having a series of apertures 109 of gradually increasing size arranged to register with a port 110 leading to the brake pipe passage 112 according to the position of the disk. The disk is rotated to its different positions by a hand wheel 113 mounted on the end of the shaft 111 which is secured to the disk. In full release position the through port 94 registers with both ports 104 and 105, so that air is supplied through the rotary valve directly to the brake pipe and also to the feed regulating device. In running position port 94 registers only with port 105 as shown in Fig. 13 and air is then admitted to the feed passage 106 and thence flows through one of the apertures 109, according to the adjustment of the disk 108, and port 110 to passage 112 leading to the brake pipe.

In making a reduction in brake pipe pressure the rotary valve is turned to a position in which one of the port openings 97 to 101 inclusive registers with exhaust port 103, communication being then established to the brake pipe port 102, it being noted that when one of the ports 97 to 101 registers with port 103, either the large ports 96 or one or more of the ports 97 to 101 will at the same time register with port 102. Thus any desired rate of reduction in brake pipe pressure may be produced and maintained, from a very gradual one in which port 101 registers with port 96 to an emergency reduction in which the full port opening 96 registers with port 102 and the large port opening 97 registers with port 103.

In order to test a triple valve, a gasket is applied to the triple valve flange and the triple valve is placed against the face of the stand in a vertical position and the cock 22 is opened. This draws up the jaws 46 of the clamping device to firmly clamp the triple valve in position. If the triple valve is of the pipeless type the cock 35 is opened and cock 37 is closed and if provided with pipe connections, the cock 35 is closed and the cock 37 is opened.

The tests are commenced with cocks 33, 34, 11, and exhaust cock 114 open and to test the triple valve for charging, with brake valve 4 in release position, close cock 11 and open cock 36. This permits air to flow through the brake pipe to the triple valve and around the triple valve piston to charge the auxiliary reservoir. The time required to charge the auxiliary reservoir is then noted and compared with the time in which the auxiliary reservoir should charge.

To test the triple valve for sensitiveness in moving to service position, start with the cocks 36, 33, 34, and 114 open, brake valve 4 in release position and valve 14 in position 2, in which the brake pipe and the upper and lower sides of the diaphragm are connected together and lever 67 adjusted so as to load the diaphragm 47 with weights to correspond with the desired differential of pressures between auxiliary reservoir and brake pipe. The valve 14 is then placed in position four in which the chamber 50 above diaphragm 47 is connected to pipe 16 and the brake pipe volume reservoir 82, and vent chamber 75 is connected with the auxiliary reservoir and the chamber 51 at the under face of the diaphragm. Brake valve 4 is now moved to one of the application positions, according to the rate of reduction in brake pipe pressure desired and at which the triple ought to move to service position. If the triple valve is of the desired sensitiveness, the same will then move to service position, but if the triple sticks, then a greater differential of pressures on the triple valve piston builds up before the triple moves. The brake pipe pressure on top of the diaphragm 47 consequently falls so that the difference in pressures thereon is greater than the predetermined amount, and this causes the preponderating auxiliary reservoir pressure at the under face of the diaphragm to lift the same and open the vent valve 76, so that air is vented from the auxiliary reservoir. Thus the excessive reduction required to move the triple is indicated by blowing of air at the vent valve.

To test the triple valve for packing ring leakage, the test is commenced with cocks 36, 33, 34 and 114 open, valve 4 in full release position, lever 67 adjusted according to the desired difference between auxiliary reservoir and brake pipe, and valve 14 in position 3. Brake valve 4 is now turned to one of its application positions to cause a reduction in brake pipe pressure and then back to lap. The feed regulating device 107 is adjusted so as to feed air into the brake pipe at a predetermined desired rate and the brake valve 4 is turned to running position in which air is supplied to the brake pipe only through the feed regulating device. Under these conditions, the differential of pressures between the auxiliary reservoir and brake pipe is maintained by the operation of the differential valve mechanism 13, and any leakage past the triple valve piston from the brake pipe to the auxiliary reservoir will be indicated on the auxiliary reservoir gage, by an increase in pressure. This rate of increase of pressure should not exceed a certain number of pounds in a given time, say for example, five pounds in thirty seconds.

The triple valve may be tested for sensitiveness to movement to release position by leaving cocks 36, 33, 34, and 114 open, brake valve 4 in full release position, valve 14 in position 3, and lever 67 in proper position to maintain the difference of pressures at which it is desired that the triple valve should move to release position. Brake valve 4 is now turned to one of its application positions and then back to lap position. Feed regulating device 107 is also adjusted to one of its feeding positions to give a predetermined rate of feed to the brake pipe, and valve 14 is turned to position one, in which the auxiliary reservoir is connected to the chamber above diaphragm 47, the brake pipe is connected to the chamber below the diaphragm and the brake pipe reservoir to the vent chamber 75. The brake valve 4 being moved to running position, air is fed to the brake pipe through the feed regulating device at a predetermined rate. Under these conditions the triple valve should release. A failure to release will be accompanied by a discharge of air at the vent valve 76, indicating that the frictional resistance to movement of the piston and slide valve is excessive.

In order to test the triple valve for service port capacity, means are provided for feeding air into the auxiliary reservoir at a predetermined rate, in connection with the apparatus already described. For this purpose a valve mechanism 9 is interposed in pipe 8 leading from reservoir 1 to the auxiliary reservoir 7. This valve mechanism may be constructed as shown in Fig. 10, in which a seat is provided for a removable disk 115 having an aperture therein of a predetermined size to permit flow of air therethrough at a certain rate from the inlet 116 leading to reservoir 1 to the outlet 117 leading to the auxiliary reservoir. A number of such disks having different sized apertures are provided as desired.

The disks are held in position on the seat by means of a clamping wheel 118 and a screw 119 adapted to bear on a cap 120 which extends into the casing and engages the top of the disk, and upon turning the handle 118 the screw 119 forces the cap home and the disk 115 is held firmly on its seat.

The test for service port capacity is started with cocks 36, 34, exhaust cock 121, opening to brake cylinder pipe 25, and cock 114 open, brake valve 4 in full release position, valve 14 in position 3 or lap. Valve device 9 is now adjusted to give a desired predetermined feed of air into the auxiliary reservoir, valve 14 is placed in position two, and brake valve 4 is turned to an application position and the brake pipe pressure is reduced to say fifty pounds, the auxiliary reservoir pressure reducing at the same time, as in position two of valve 14, the auxiliary reservoir is connected with the brake pipe. Valve 4 is now returned to lap position and valve 14 is turned to position three. Cock 10 is now opened so that air is fed from the supply reservoir at a predetermined rate through the feed device 9, to correspond with the flow of air that should take place through the service port of the triple from the auxiliary reservoir to the brake cylinder. The brake cylinder pipe exhaust cock 121 being open, air supplied to the brake cylinder escapes to the atmosphere, and so if the flow of air through the triple service port is at the same rate as the flow of air through the feed device to the auxiliary reservoir, no movement of the triple valve piston occurs, but should the service port be too restricted or the graduating spring too weak, the auxiliary reservoir pressure will increase so as to predominate over the brake pipe pressure and thereby cause the triple valve to shift to emergency position. In place of the auxiliary reservoir feed regulating device 9 already described I may employ a feed device similar to the feed device 107 employed with the brake valve 4. By employing the latter construction it is only necessary to turn the hand wheel to different positions in order to obtain any desired rate of feed to the auxiliary reservoir.

Various other tests may be made with this apparatus which need not be enumerated here, but will be understood by those familiar with the art of triple valve testing.

It will be evident that various parts of the apparatus may be employed for and are adapted to a more extensive use than that of testing triple valves, for instance, the differential pressure regulating mechanism is adapted for maintaining a constant relation between the pressures of two receptacles whenever such condition is required. Where triples are tested in which a supplemental reservoir is employed, a branch pipe 130 connecting the supply pipe 23 with a port in the triple valve stand leading to the supplemental reservoir port of the triple valve.

If it is desired to make a definite volumetric reduction in brake pipe pressure, an expansion reservoir 131 may be provided, the same being connected to the exhaust pipe of the brake valve 4 and normally open to the atmosphere through the exhaust cock 114. When employing this reservoir, the exhaust cock 114 is closed, so that upon turning the brake valve to an application position, fluid from the brake pipe is vented to the reservoir 131 until the pressures in the brake pipe and reservoir equalize.

Having now described my invention, what I claim as new and desire to secure by Letters Patent, is:—

1. In a triple valve testing apparatus, the combination with a brake pipe and auxiliary reservoir, a movable abutment subject to the opposing pressures of the auxiliary reservoir and brake pipe, means for loading the abutment to correspond with a predetermined difference in pressures between the auxiliary reservoir and brake pipe, and valve means governed by said abutment for regulating the pressure on one side of said abutment to maintain said difference in pressures constant.

2. In a triple valve testing apparatus, the combination with a brake pipe and auxiliary reservoir, of a movable abutment subject to the opposing pressures of the auxiliary reservoir and brake pipe, valve means operated by said abutment for regulating the fluid pressure on one side of said abutment, a plurality of weights for loading said abutment, and manually operated means for relieving the abutment of the load of one or more weights.

3. In a triple valve testing apparatus, the combination with a brake pipe and auxiliary reservoir, of a movable abutment subject to the opposing pressures of the auxiliary reservoir and brake pipe, valve means operated by said abutment for regulating the fluid pressure on one side of said abutment, a plurality of weights adapted to be suspended from said abutment to apply a load thereto corresponding with a predetermined difference in pressures, and manually operated means for varying the number of weights acting on said abutment.

4. A pressure regulating mechanism for testing valve mechanisms employed with fluid pressure brakes comprising two receptacles containing fluid under pressure, means for gradually reducing the pressure in one receptacle, a movable abutment subject to the opposing pressures in said receptacles, means for loading said abutment to correspond with a predetermined difference in pressures, and a vent valve operated by said abutment for releasing fluid from the receptacle the pressure in which opposes that in the receptacle whose pressure is being reduced to maintain said predetermined difference in pressure constant.

5. In a triple valve testing apparatus, the combination with a brake valve provided with a supply port and having means for varying the brake pipe pressure, of a feed regulating mechanism comprising a rotatable disk valve having a series of ports of graduated sizes and having a seat provided with a port for supplying fluid to said supply port upon registry with one of said series of ports and a manually operated handle for rotating said disk valve.

6. The method of testing triple valves to determine the capacity of the service port, which consists in reducing the train pipe pressure to effect movement of the triple valve to service application position and in then feeding fluid to the auxiliary reservoir at a predetermined rate.

In testimony whereof I have hereunto set my hand.

CLYDE C. FARMER.

Witnesses:
WM. M. CADY,
A. M. CLEMENTS.